US011679828B2

(12) United States Patent
Robinson

(10) Patent No.: US 11,679,828 B2
(45) Date of Patent: Jun. 20, 2023

(54) ADJUSTABLE WHEEL CRADLE FOR MAINTAINING BICYCLES IN AN UPRIGHT POSITION

(71) Applicant: Marcus A. Robinson, Owings Mills, MD (US)

(72) Inventor: Marcus A. Robinson, Owings Mills, MD (US)

( * ) Notice: Subject to any disclaimer, the term of this patent is extended or adjusted under 35 U.S.C. 154(b) by 0 days.

(21) Appl. No.: 17/606,604

(22) PCT Filed: Apr. 20, 2020

(86) PCT No.: PCT/US2020/028934
§ 371 (c)(1),
(2) Date: Oct. 26, 2021

(87) PCT Pub. No.: WO2020/219373
PCT Pub. Date: Oct. 29, 2020

(65) Prior Publication Data
US 2022/0234667 A1    Jul. 28, 2022

Related U.S. Application Data

(60) Provisional application No. 62/839,226, filed on Apr. 26, 2019.

(51) Int. Cl.
*B62H 3/08* (2006.01)
*A47F 7/04* (2006.01)
*A47B 81/00* (2006.01)

(52) U.S. Cl.
CPC ............ *B62H 3/08* (2013.01); *A47F 7/04* (2013.01); *A47B 81/007* (2013.01)

(58) Field of Classification Search
CPC .... B62H 3/08; B63H 3/00; A47F 7/04; B60B 30/00; A47B 81/007; H05K 5/0234; B25B 1/10
See application file for complete search history.

(56) References Cited

U.S. PATENT DOCUMENTS 519,016 A * 5/1894 Clairemont .............. B62H 3/00
                                                                211/175
2,907,238 A * 10/1959 White ................... B25B 1/2484
                                                                269/252

(Continued)

FOREIGN PATENT DOCUMENTS

CN    202557656    11/2012
CN    109050723    12/2018

*Primary Examiner* — Ko H Chan
(74) *Attorney, Agent, or Firm* — Royal W. Craig; Gordon Feinblatt LLC

(57) ABSTRACT

A wheel cradle (100) for bicycles that can be quickly and easily adjusted to accommodate bicycle tires of varying width. The wheel cradle (100) includes a first side panel (140) and a second side panel (140), each attached to a base (110), each oriented substantially parallel to a longitudinal axis, and each extending substantially vertically. An adjustment device (150) is configured to variably adjust the first side panel (140) and/or the second side panel (140) in a direction substantially parallel to the transverse axis to seat the bicycle wheel. The wheel cradle (100) is especially well-suited for combined use in a rack to park multiple bicycles, the rack easily breaking down for compact transport and storage.

17 Claims, 4 Drawing Sheets

(56) References Cited

U.S. PATENT DOCUMENTS

| | | | | |
|---|---|---|---|---|
| 3,060,917 | A * | 10/1962 | Dickey | B25H 1/00 125/35 |
| 3,603,459 | A * | 9/1971 | Erb | B62H 3/08 211/20 |
| 4,050,583 | A * | 9/1977 | Szabo | B62H 3/08 211/20 |
| 4,076,229 | A * | 2/1978 | Hickman | B25H 1/04 269/244 |
| 5,749,475 | A * | 5/1998 | Krebs | A47F 7/04 211/23 |
| 5,988,402 | A * | 11/1999 | Mayfield | B62H 3/04 211/20 |
| 6,095,746 | A * | 8/2000 | Bergin | B62H 3/08 269/216 |
| 6,193,078 | B1 * | 2/2001 | Stuhlmacher | B62H 3/00 248/176.1 |
| 6,581,785 | B1 * | 6/2003 | Falkenstein | A47F 7/04 248/152 |
| 6,866,282 | B2 * | 3/2005 | Heerspink | B62H 3/08 211/20 |
| 6,868,976 | B1 | 3/2005 | Lassanske et al. | |
| 8,104,588 | B2 * | 1/2012 | Curlee | B62H 3/08 211/20 |
| 8,800,786 | B2 * | 8/2014 | Parkins | F16M 11/02 211/195 |
| 9,364,937 | B2 * | 6/2016 | Taylor | B25B 1/2489 |
| 9,988,117 | B2 | 6/2018 | Robinson | |
| 11,383,354 | B1 * | 7/2022 | Taylor | B25B 1/2478 |
| 2003/0068472 | A1 * | 4/2003 | Benson | B29C 70/40 428/188 |
| 2004/0084491 | A1 * | 5/2004 | Gibson | B60P 3/122 224/403 |
| 2009/0107932 | A1 * | 4/2009 | Henthorn | B62H 3/08 211/20 |
| 2017/0240231 | A1 | 8/2017 | Robinson | |

* cited by examiner

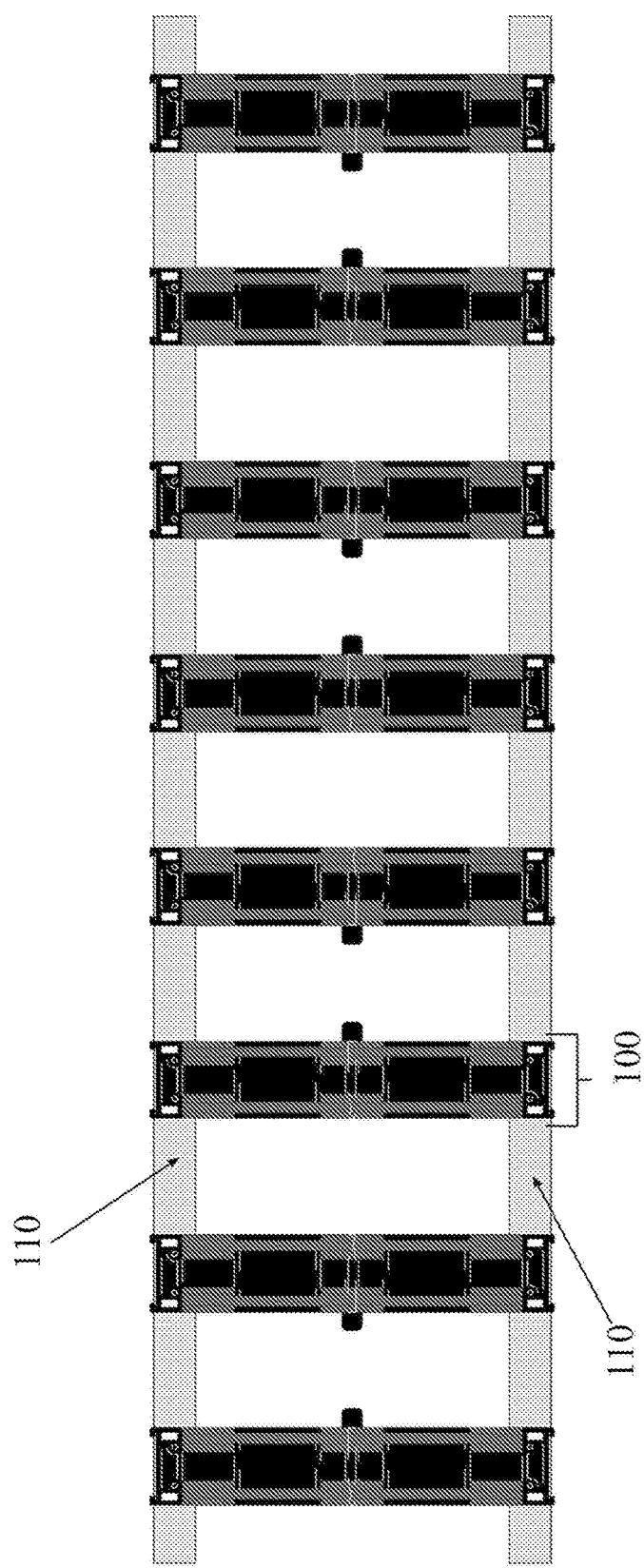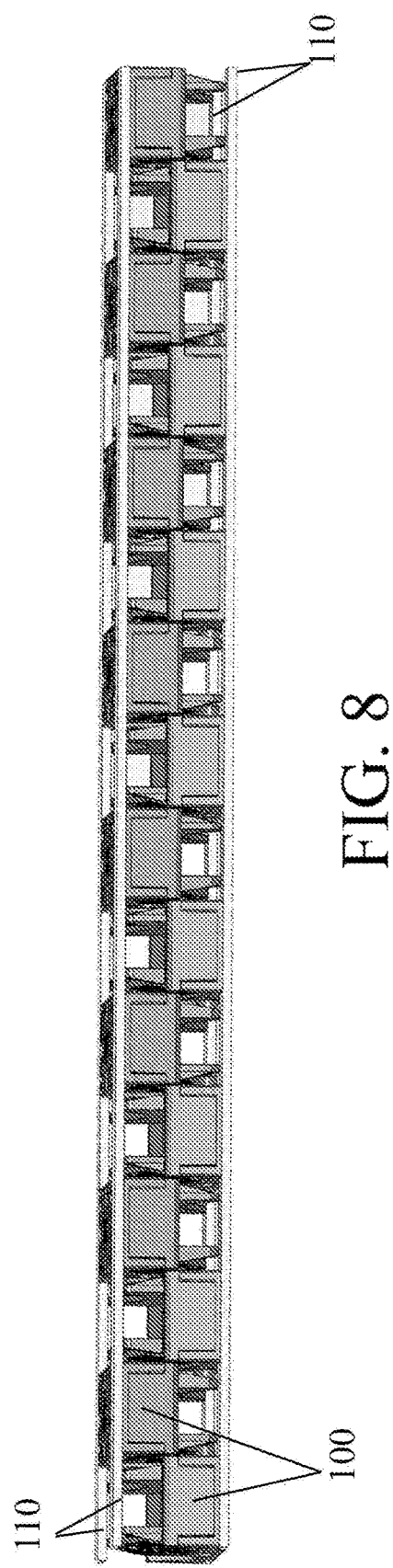
FIG. 7
FIG. 8

ADJUSTABLE WHEEL CRADLE FOR MAINTAINING BICYCLES IN AN UPRIGHT POSITION

CROSS-REFERENCE TO RELATED APPLICATION(S)

The present application derives priority from U.S. Provisional Application 62/839,226 filed 26 Apr. 2019, the entirety of which is incorporated herein by reference.

BACKGROUND OF THE INVENTION

1. Field of the Invention

The present invention relates to bicycle stands in general, and more specifically to a wheel cradle for a bicycle stand that adjusts by turning a dial to accommodate bicycle tires of varying width.

2. Description of the Background

Historically, bicycles came with kickstands to keep them upright when not in use. Kickstands, however, are not favored by competitive cyclists who prefer not to add the extra weight to their bicycles.

Bicycle stands are an alternative to kickstands, but most bicycle stands have a fixed width that cannot be adjusted to accommodate bicycle tires of varying width. An exception is shown in U.S. Pat. No. 9,988,117 to the present inventor, which adjusts to bicycles with tires of varying width by inserting panels into different grooves. While an improvement in comparison to fixed width bicycle stands, using such an adjustable bicycle rack involves a process of trial and error to figure out which grooves correspond to the width of a given bicycle tire. Accordingly, there is a need for a bicycle stand that easily adjusts to accommodate bicycle tires of varying width.

SUMMARY OF THE INVENTION

It is an object of the present invention to provide an improved wheel cradle for bicycle stands that more easily adjusts to bicycles with tires of varying width. This is achieved with an improved bicycle stand with at least one wheel cradle having a base with a longitudinal axis and a transverse axis, where the base extends substantially horizontally. The wheel cradle can include a first side panel and a second side panel, each attached to the base, each oriented substantially parallel to the longitudinal axis, and each extending substantially vertically. The wheel cradle can also include an adjustment device configured to variably adjust the first side panel and/or the second side panel in a direction substantially parallel to the transverse axis to define a channel configured for seating a wheel.

For a more complete understanding of the invention, its objects and advantages, refer to the remaining specification and to the accompanying drawings.

BRIEF DESCRIPTION OF THE DRAWINGS

FIG. 7 shows a top view of a single rack section 100 with multiple wheel cradles 100.

FIG. 8 shows a side view of two rack sections 100 stowed in a compact configuration for transort.

DETAILED DESCRIPTION OF THE PREFERRED EMBODIMENTS

The present invention is an improved wheel cradle for bicycle stands that more easily adjusts to bicycles with tires of varying width. The width of the improved wheel cradle can be adjusted by turning a dial.

Figure 1:
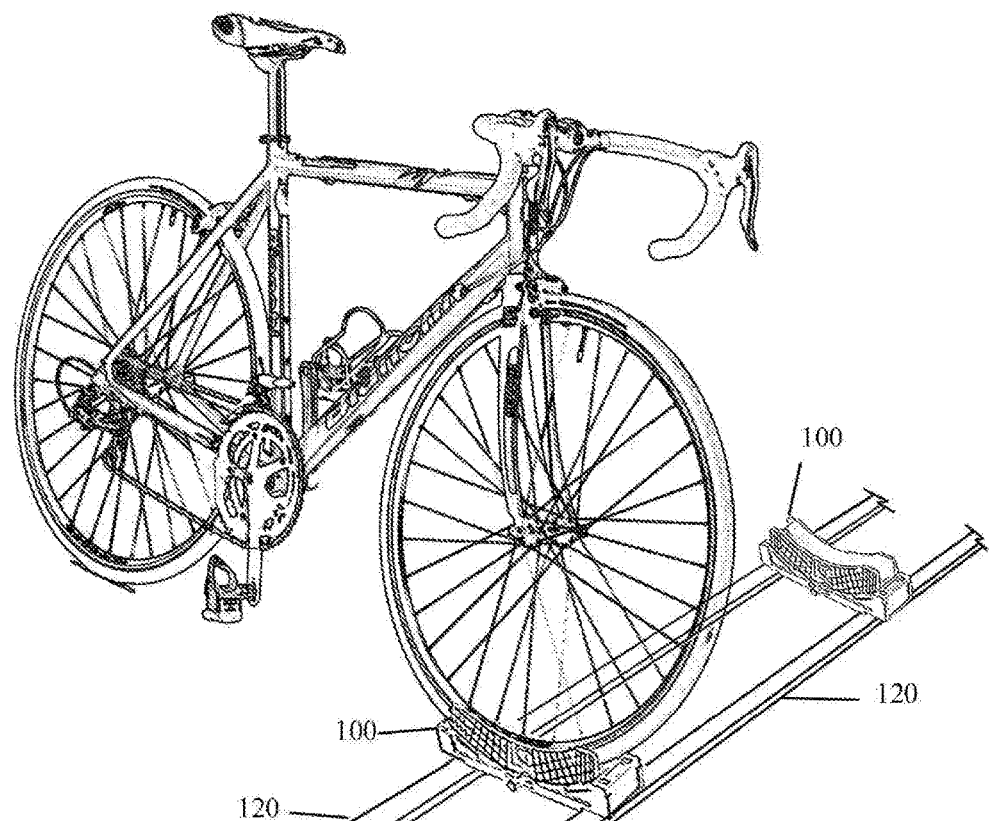
FIG. 1 shows a perspective view of several wheel cradles 100 in a rack system according embodiments of this disclosure.

FIG. 1 shows a perspective view of several wheel cradles 100 in a rack system according embodiments of this disclosure. When deployed (as shown) a plurality of cradles 100 may be variably attached along two parallel beams 120 and spaced as desired therealong, each cradle 100 seating one bike wheel in a central slot 102. The evenly-spaced ladder-like configuration of wheel blocks maintains standing stability of the cradles 100 and bikes, and effectively spaces the bikes to prevent entanglement. Moreover, as will be described the width of each central slot 102 may be independently adjusted for thin or thick wheels.

Figure 2:
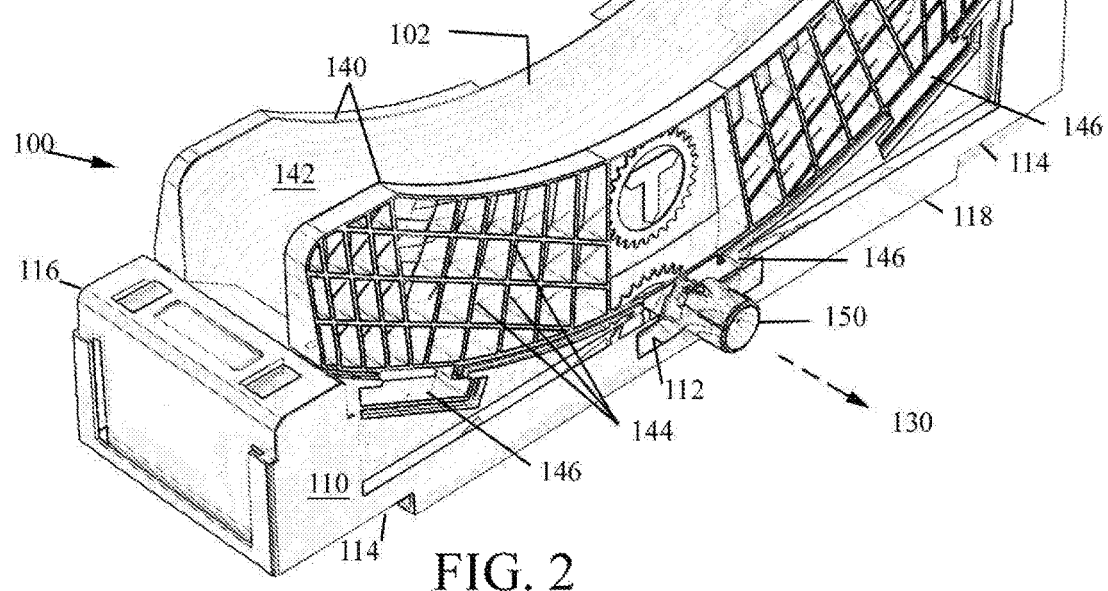
FIG. 2 is an enlarged perspective view of an exemplary wheel cradle 100 of FIG. 1.

FIG. 2 shows a perspective view of an example wheel cradle 100 according embodiments of this disclosure. The wheel cradle 100 includes a base 110 having raised end-walls 116 joined end-to-end by an elongate platform 118, platform 118 extending perpendicular to a transverse axis 130. Cradle 100 includes two parallel walls 140 slidably journaled into base 110 and adjustable along the transverse access 130 for variable spacing. The spacing adjustment is accomplished with a knob 150. Each wall 140 is shaped in an arcuate segment conformal to the bike wheel to be inserted therein. Each wall 140 is formed with an interior flat face 142 and is outwardly reinforced by a waffle pattern of reinforcing ribs 144 including an outer surrounding rib. The arcuate bottom of wall 140 is interrupted by a plurality of (e.g., three) evenly-spaced T-shaped tabs 146 that project radially. Importantly, the platform 118 of base 110 has an arcuate upper surface conforming to the walls 140, and the projecting T-tabs 146 of walls 140 are slidably received in conforming transverse notches 112 in platform 118. Platform 118 has a substantially flat bottom with transverse channels 114 at each end for receiving transverse beams 120 (FIG. 1).

Figure 3:
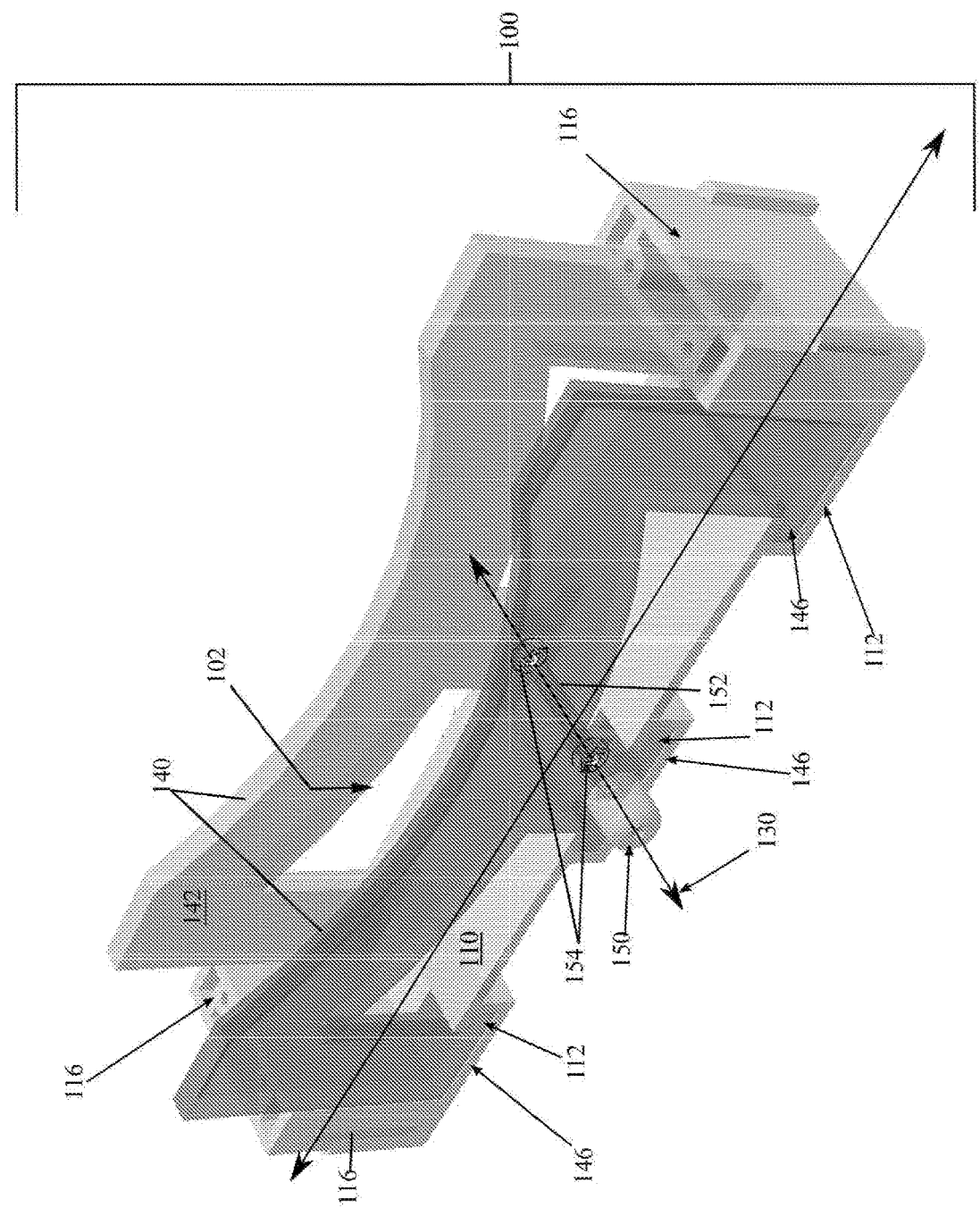
FIG. 3 is a side assembly view of an example wheel cradle 100 as in FIGS. 1-2.

FIG. 3 is a side assembly view of an example wheel cradle 100 as in FIGS. 1-2 illustrating the mechanism of action. An adjustment screw 152 is anchored at one end in knob 150 and traverses the base 110 through both near and far walls 140. Both near and far walls 140 have an adjustment nut 154 embedded therein, and the two nuts are contra-threaded. Screw 152 is screwed through both nuts 154. Thus, clockwise turning of knob 150 turns the screw 152 accordingly and compresses the walls 140, urging the closer. Conversely, counter-clockwise turning of knob 150 turns the screw 152 accordingly and expands the walls 140, urging them apart.

In use, the base 110 may sit on the ground or other surface upon which a user wishes to park her bicycle. Given the beams 120 of FIG. 1, such a surface need not be substantially horizontal with respect to the bicycle. For example, the surface may be on an incline or uneven, and thus base 110 can be in a non-horizontal orientation with respect to the surface upon which it rests but substantially horizontal with respect to walls 140. Wheel cradle 100 adjustment knob 150 that is configured to variably adjust the near wall 140 with respect to the far wall 140 in a direction substantially parallel to the transverse axis 130.

One skilled in the art should understand that the opposing walls 140 can be adjusted by any suitable adjustment mechanism for which turning the knob 150 clockwise contracts the walls 140 while counter-clockwise expands the walls 140. In addition, one wall 140 may be fixed with respect to base 110 and the other wall 140 may be adjustable within base 110. In such embodiments a single nut 154 is needed and near wall 140 may simply have a hole without threading. In such embodiments, screw 152 compresses or expands one wall 140 with respect to one fixed wall 140.

In all the foregoing embodiments opposing walls 140 define an adjustable-width arcuate channel 102 configured for nesting a bicycle wheel. The adjustable channel 102 can expand or contract such that wheel cradle 100 can accommodate a wide range of wheel widths for a wide range of bicycles, ranging in widths from 1 inch to 3.25 inches. For example, in embodiments of this disclosure, wheel cradle 100 can be adjusted to accommodate a road bicycle wheel, a hybrid bicycle wheel, a mountain bicycle wheel, a cyclocross bicycle wheel, a track bicycle wheel, a BMX bicycle wheel, a recumbent bicycle wheel, a prone bicycle wheel, a unicycle wheel, a hand-cycle wheel, a wheelchair wheel, a tricycle wheel, ebikes, and/or a tandem bicycle wheel.

Figure 4:
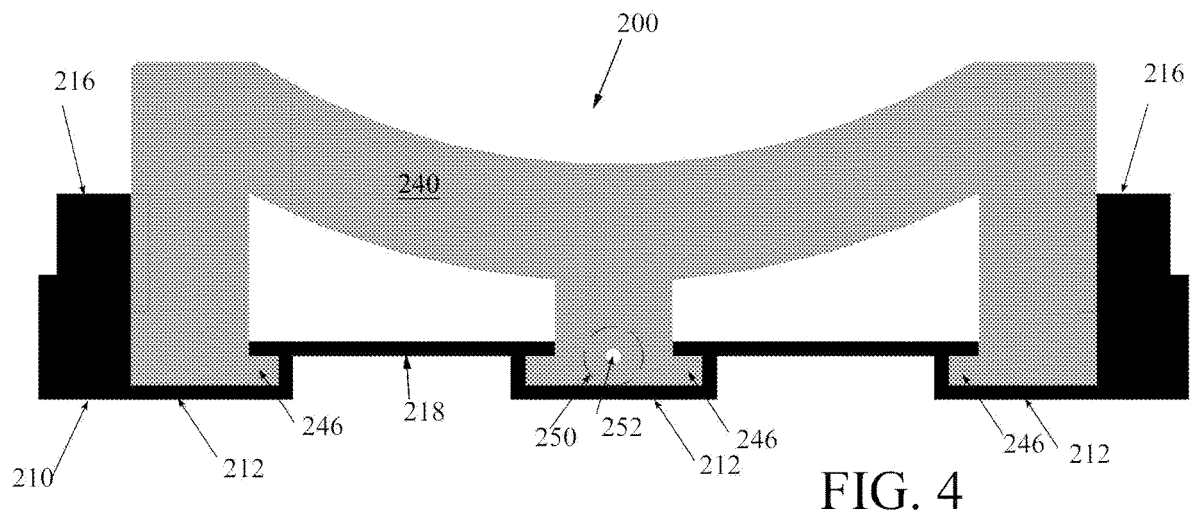
FIG. 4 is a front view of an examplary wheel cradle 200 according to another embodiment.
Figure 5:
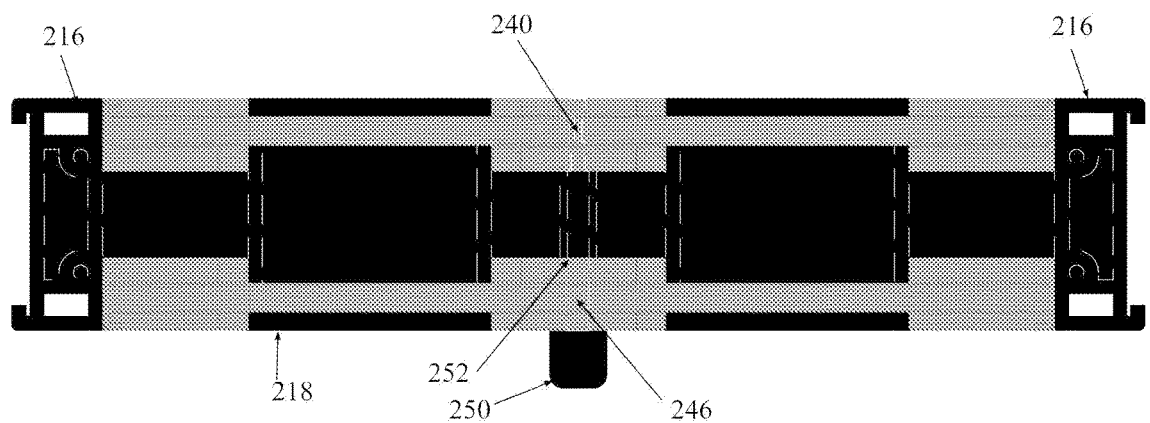
FIG. 5 is a top view of the wheel cradle 200 of FIG. 4.
Figure 6:
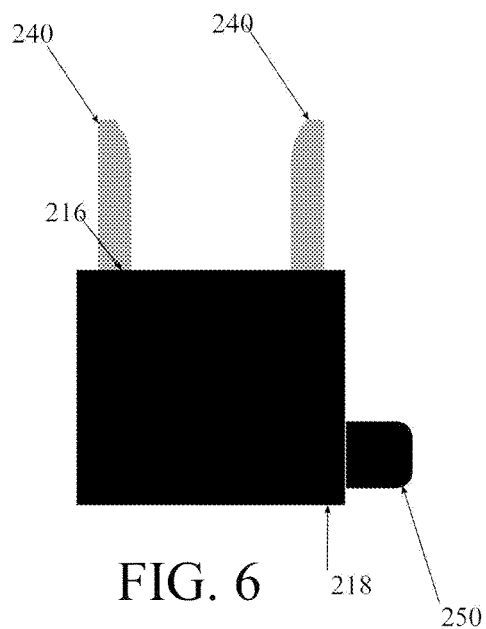
FIG. 6 is a side view of the wheel cradle 200 of FIGS. 4-5.

FIGS. 4-6 show a wheel cradle 200, according to a modified embodiment of the invention. As above the wheel cradle 200 includes a base 210 having raised end-walls 216 joined end-to-end by an elongate platform 218, platform 218 extending perpendicular to a transverse axis as above. Cradle 200 includes two parallel walls 240 slidably journaled into base 210 and adjustable along the transverse axis for variable spacing. The spacing adjustment is accomplished with a knob 250. Each wall 240 is shaped in an arcuate segment, but the plurality of (e.g., three) evenly-spaced T-shaped tabs 246 project parallelly down not radially. The platform 218 of base 210 has a flat upper surface and the projecting T-tabs 246 of walls 240 are slidably received in conforming transverse notches 212 in platform 218. Adjustment screw 252 is anchored in knob 250 as described above and traverses the platform 218 through both near and far walls 240. Clockwise turning of knob 250 turns the screw 252 accordingly and compresses the walls 240, urging the closer. Conversely, counter-clockwise turning of knob 250 turns the screw 252 accordingly and expands the walls 240, urging them apart.

Bicycle stands can include multiple wheel cradles 100, 200 for accommodating multiple wheeled vehicles, such as bicycles, according to embodiments of this disclosure. As described previously, FIG. 1 shows a transition area bicycle rack with multiple wheel cradles 100 according to embodiments of this disclosure. Any number of wheel cradles 100 can be fixedly or removably attached to opposing beams 110 at any desired spacing. Wheel cradles 100 may be removably attached to beams 110 such as by compression, screwing, or clamping mechanisms; fixedly attached, and/or pivotably attached. Rails 110 may be any length suitable for the purposes of this disclosure. In embodiments having multiple wheel cradles 100, any number and spacing of wheel cradles 100 may be employed along beam 110. In some embodiments, wheel cradles 100 can be substantially equidistant from each other and pivotably attached to beams 110 such that beams 110 and wheel cradles 100 can be stored in a compressed, stowed position.

Preferably, all wheel cradles 100 bear the same transverse slots 114 (FIG. 2) and beams 110 are slidably received in slots 114, and so cradles 100 can be spaced along opposing beams 110 at any desired spacing. In an embodiment beams 110 are slidably held captive in slots 114 by a tongue-in-groove profile because this facilitates the most compact storage configuration possible.

As seen in FIGS. 7-8, the wheel cradles 100 can be adjusted along beams 110 with a more condensed spacing than as shown in FIG. 1, optimally spaced by the exact width of cradle 100. This way, as seen in FIG. 8, two opposing assemblies of wheel cradles 100 on beams 110 can be conjoined in a facing relationship such that the wheel cradles 100 along one assembly fit into the spaces between wheel cradles 100 of the other assembly to conserve space. This allows many conjoined pairs of opposing assemblies of wheel cradles 100 on beams 110 to be carried in a truck.

Components of the invention can be formed from any materials suitable for the purposes of this disclosure. For example, cradle 100 components such as base 110, and side walls 140 are preferably formed of molded plastic. Other components such as beams 110 can be formed from metals, such as titanium, magnesium, tungsten, aluminum, steel; wood and wood products. Components of embodiments of this disclosure can be manufactured according to any manufacturing technique suitable for the purpose of this disclosure, such as extrusion, casting, and/or additive manufacturing processes. Components of embodiments of this disclosure can be attached or otherwise joined according to any attachment mechanisms suitable for the purposes of this disclosure. For example components may be screwed, bolted, nailed, latched, clasped, clamped, stapled, fused, bonded, glued, welded, compression fit, and/or riveted together.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

STATEMENT OF INDUSTRIAL APPLICABILITY

There is a significant commercial need for a bicycle stand that can be quickly and easily adjusted to accommodate bicycle tires of varying width. The invention provides an improved bicycle stand capable of the foregoing and especially well-suited for combined use in a rack to park multiple bicycles that breaks down for easy transport and storage.

I claim:
1. A wheel cradle, comprising:
an elongate base having a longitudinal axis and a transverse axis, and an arcuate upper surface defined by a plurality of transverse notches;
a first side panel and a second side panel attached to the base and oriented substantially parallel to the longitudinal axis, said first side panel and second side panel both having an arcuate edge conforming to the arcuate upper surface of said base, and said first side panel having a plurality of tabs projecting radially from said arcuate edge and slidably received in the transverse notches of said base; and an adjustment device configured to variably adjust said first side panel relative to the second side panel, in a direction substantially parallel to the transverse axis to define a channel configured for seating a wheel.

2. The wheel cradle of claim 1, wherein:

the first panel and the second panel each have an inward face and an outward face; and the adjustment device comprises a shaft oriented substantially parallel to the transverse axis and a rotatable dial disposed on an outward face of the first panel and configured to screw inward and outward along the shaft to decrease and increase a distance between the inward face of the first side panel and the inward face of the second side panel along the transverse axis.

3. The wheel cradle of claim 1, wherein the wheel is selected from a group consisting of: a road bicycle wheel, a hybrid bicycle wheel, a mountain bicycle wheel, a cyclo-cross bicycle wheel, a track bicycle wheel, a BMX bicycle wheel, a recumbent bicycle wheel, a prone bicycle wheel, a unicycle wheel, a hand-cycle wheel, a wheelchair wheel, a tricycle wheel, and a tandem bicycle wheel.

4. The wheel cradle of claim 1, wherein the second side panel has a plurality of tabs projecting radially from its arcuate edge and slidably received in the transverse notches of said base, and said adjustment device is configured to variably move both said first side panel and second side panel.

5. A bicycle stand, comprising a plurality of wheel cradles as claimed in claim 1.

6. A wheel cradle, comprising:

a base having raised end-walls joined end-to-end by an elongate platform, the platform having an arcuate upper surface defined by a plurality of transverse notches;

a pair of parallel walls both having an arcuate bottom edge conforming to the arcuate upper surface of said platform and a plurality of tabs projecting radially from said arcuate edge and slidably journaled into the transverse notches of the upper surface of the platform of said base for relative adjustment; and an adjustment mechanism for selectively moving both of said pair of parallel walls toward and away from each other.

7. The wheel cradle of claim 6, wherein each wall of said pair of parallel walls is shaped in an arcuate segment.

8. The wheel cradle of claim 6, wherein each wall of said pair of parallel walls is formed with an interior flat face.

9. The wheel cradle of claim 6, wherein each wall of said pair of parallel walls is reinforced by a waffle pattern of reinforcing ribs.

10. The wheel cradle of claim 6, wherein each wall of said pair of parallel walls has a plurality of projecting tabs slidably received in said base.

11. The wheel cradle of claim 6, wherein said radially-projecting tabs further comprises evenly-spaced radially projecting T-shaped tabs held captive in the transverse notches of the upper surface of the platform of said base.

12. The wheel cradle of claim 6, wherein said adjustment mechanism is an adjustment screw having two contra-threads.

13. A wheel cradle, comprising:

a base having raised end-walls joined end-to-end by an elongate platform, the platform having an arcuate upper surface defined by a plurality of transverse notches;

a pair of parallel walls both having an arcuate bottom edge conforming to the arcuate upper surface of said platform and a plurality of T-shaped tabs projecting radially from the arcuate bottom edge and slidably held captive in the transverse notches in the upper surface of the platform of said base for relative adjustment of a spacing between said pair of walls; and an adjustment mechanism for adjusting the spacing between said pair of walls.

14. The wheel cradle of claim 13, wherein each wall of said pair of parallel walls is shaped in an arcuate segment.

15. The wheel cradle of claim 13, wherein each wall of said pair of parallel walls is formed with an interior flat face.

16. The wheel cradle of claim 13, wherein each wall of said pair of parallel walls is reinforced by a waffle pattern of reinforcing ribs.

17. The wheel cradle of claim 13, wherein the transverse notches are equi-angularly spaced along the arcuate upper surface of said base.

* * * * *